(12) United States Patent
Sakurada

(10) Patent No.: US 8,674,567 B2
(45) Date of Patent: Mar. 18, 2014

(54) UNIT HOUSING FOR MOTOR UNIT

(75) Inventor: Manabu Sakurada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 199 days.

(21) Appl. No.: 13/352,351

(22) Filed: Jan. 18, 2012

(65) Prior Publication Data
US 2012/0212089 A1 Aug. 23, 2012

(30) Foreign Application Priority Data

Feb. 18, 2011 (JP) ................................. 2011-033527

(51) Int. Cl.
*H02K 11/00* (2006.01)
*H02K 5/00* (2006.01)

(52) U.S. Cl.
USPC .............................................. 310/71; 310/89

(58) Field of Classification Search
USPC .................................................... 310/71, 89
See application file for complete search history.

(56) References Cited

U.S. PATENT DOCUMENTS 7,816,827 B2 * 10/2010 Ishizeki et al. .................. 310/71

FOREIGN PATENT DOCUMENTS

| JP | 2009-118614 | 5/2009 |
| JP | 2009-284659 | 12/2009 |
| JP | 2009-284660 | 12/2009 |
| JP | 2009284659 A * | 12/2009 |

OTHER PUBLICATIONS

JP 2009284659 A machine translation Sep. 25, 2013.*
Japanese Office Action for corresponding JP Application No. 2011-033527, Jan. 15, 2013.

* cited by examiner

*Primary Examiner* — Tran Nguyen
*Assistant Examiner* — Leda Pham
(74) *Attorney, Agent, or Firm* — Ditthavong Mori & Steiner, P.C.

(57) ABSTRACT

A unit housing for a motor unit includes a substantially cylindrical housing body, an end housing, and connectors. The end housing has a peripheral wall and an end wall. The connectors include bolts to connect respectively 3-phase power lines to the lead wires led from the ring-shaped stator. The peripheral wall includes a recess to secure an insulating space between an inner surface of the peripheral wall and each of the connectors. The recess is provided in the inner surface of the peripheral wall at a position close to the connectors. The inner surface of the peripheral wall is provided to linearly extend from a bottom surface of the recess toward an opening end of the peripheral wall.

5 Claims, 4 Drawing Sheets

UNIT HOUSING FOR MOTOR UNIT

CROSS-REFERENCE TO RELATED APPLICATIONS

The present application claims priority under 35 U.S.C. §119 to Japanese Patent Application No. 2011-33527, filed Feb. 18, 2011, entitled "Unit Housing For Motor Unit." The contents of this application are incorporated herein by reference in their entirety.

BACKGROUND OF THE INVENTION

1. Field of the Invention

The present invention relates to a unit housing for a motor unit.

2. Discussion of the Background

One known unit housing for a motor unit includes a substantially cylindrical housing body, which contains a ring-shaped stator and a rotor, and an end housing which is butted and coupled to an end of the housing body and which covers the end of the housing body along with peripheral components, such as a sensor (see, for example, Japanese Unexamined Patent Application Publication No. 2009-284660).

In the unit housing disclosed in Japanese Unexamined Patent Application Publication No. 2009-284660, the end housing has a peripheral wall coupled to the housing body, and an end wall extending in an axially continuous form from the peripheral wall. A terminal holding block for connecting 3-phase power lines led in from the outside of the end housing and 3-phase lead wires on the stator side, respectively, is mounted to a part of an upper region of the end housing. Although the terminal holding block is in itself made of an insulating material, e.g., a resin, electroconductive bus bars and conducting terminals are disposed in a part of the terminal holding block.

The terminal holding block includes a cylindrical holder portion corresponding to each phase, and the conducting terminal is disposed within the holder portion. Further, the terminal holding block is fixedly mounted to an outer surface of the end wall in such a state that three holder portions are inserted from the outer side to the inner side of the end wall of the end housing. Three bus bars connected respectively to 3-phase cables on the PDU (Power Drive Unit) side are attached to the terminal holding block, and each bus bar is connected to the corresponding conducting terminal within the holder portion. A cutout for wire connection is provided in each holder portion of the terminal holding block. A motor terminal (i.e., a terminal of the lead wire on the stator side) is inserted into each holder portion from the distal end side thereof and is overlaid on an upper surface of the corresponding conducting terminal. The motor terminal is fastened to the corresponding conducting terminal by using a bolt that is inserted and tightened through the cutout.

Further, in the peripheral wall of the end housing at a position facing the cutout in each holder portion, there are formed a working hole through which the bolt is tightened and a recess to secure an insulating space with respect to a head of the bolt inside the holder portion. The motor terminal and the conducting terminal inside the holder portion for each phase are fastened together by using the bolt that is tightened through the working hole from the outside of the peripheral wall of the end housing. Because the end housing is made of a metal material such as an aluminum alloy, a possibility of short-circuiting is increased if the distance between the end housing and the bolt exposed from the cutout in each holder portion is too short. However, the insulating space is secured with the presence of the recess formed in the peripheral wall of the end housing, whereby a risk of short-circuiting is avoided.

SUMMARY OF THE INVENTION

According to one aspect of the present invention, a unit housing for a motor unit comprises a substantially cylindrical housing body, an end housing, and connectors. The substantially cylindrical housing body includes a ring-shaped stator and lead wires wound around the ring-shaped stator. The end housing is made of a metal. The end housing is butted and coupled to an end surface of the substantially cylindrical housing body and covering an axial end of the substantially cylindrical housing body. The end housing has a peripheral wall and an end wall. The peripheral wall is coupled to the substantially cylindrical housing body. The end wall extends in an axially continuous form from the peripheral wall. The connectors include bolts to connect respectively 3-phase power lines to the lead wires led from the ring-shaped stator. Each of the connectors is disposed inside the end housing. The 3-phase power lines are led in the unit housing from an outside through the end wall. The peripheral wall includes a recess to secure an insulating space between an inner surface of the peripheral wall and each of the connectors. The recess is provided in the inner surface of the peripheral wall at a position close to the connectors. The inner surface of the peripheral wall is provided to linearly extend from a bottom surface of the recess toward an opening end of the peripheral wall.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
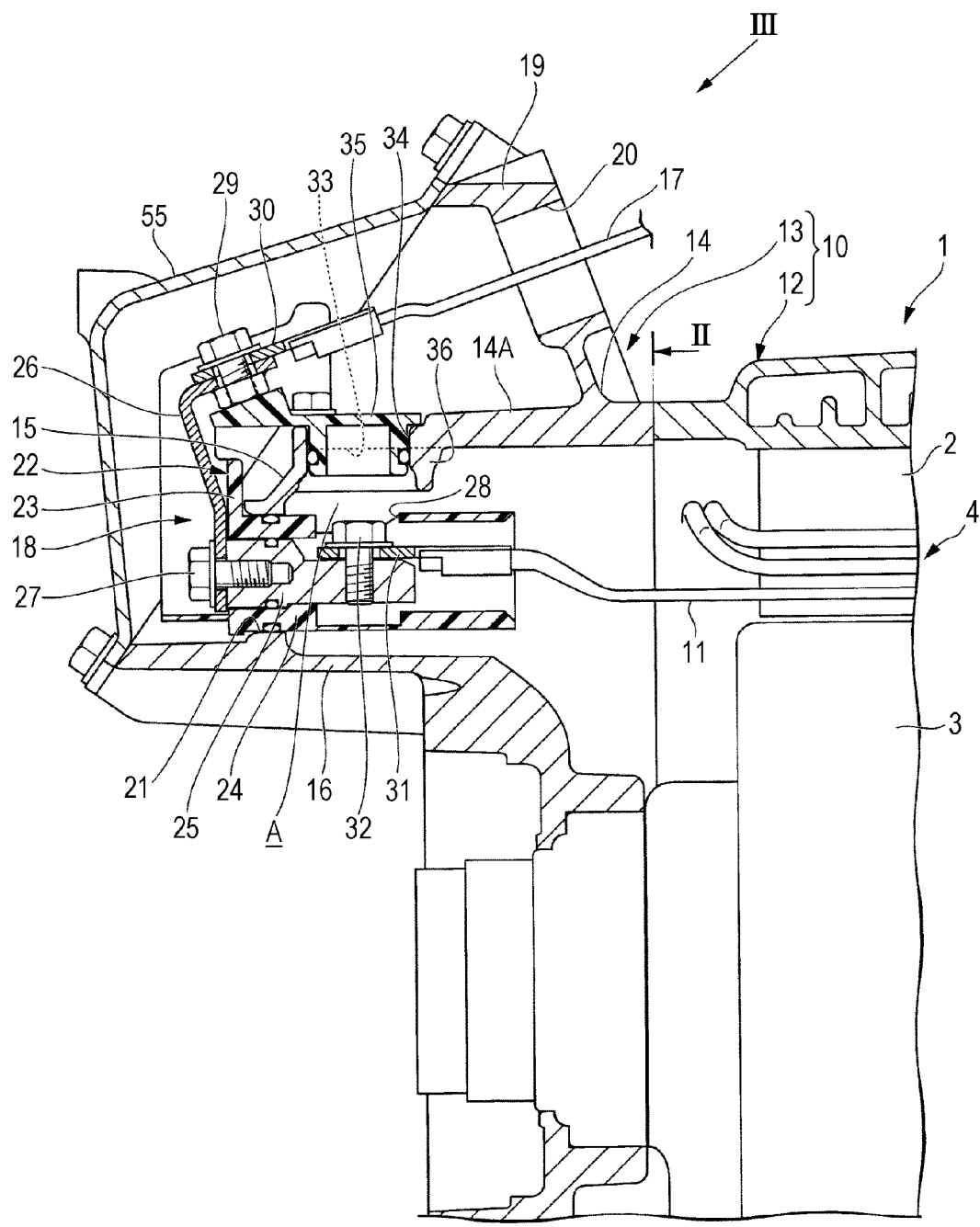
FIG. 1 is a sectional view, taken along a cross-section I-I in FIG. 2, of a motor unit according to one embodiment of the present invention.

According to an embodiment of the present invention, there is provided a unit housing for a motor unit, the unit housing including a substantially cylindrical housing body (e.g., a housing body 12 in an embodiment) containing therein a ring-shaped stator (e.g., a stator 2 in the embodiment) with lead wires (e.g., lead wires 11 in the embodiment) wound around the stator, and an end housing (e.g., an end housing 13 in the embodiment) made of a metal, the end housing being butted and coupled to an end surface of the housing body and covering an axial end of the housing body, the end housing having a peripheral wall (e.g., an outer peripheral wall 14 in the embodiment) coupled to the housing body and an end wall (e.g., an end wall 15 in the embodiment) extending in an axially continuous form from the peripheral wall, wherein connecting sections connecting respectively 3-phase power lines (e.g., cables 17 and bus bars 26 in the embodiment) led in from an outside while penetrating through the end wall and the corresponding lead wires led from the stator by using bolts (e.g., bolts 32 in the embodiment) are disposed inside the end housing, and a recess (e.g., a recess 33 in the embodiment) for securing an insulating space (e.g., an insulating space A in the embodiment) between the connecting sections and an inner surface of the peripheral wall is formed in the inner surface of the peripheral wall at a position close to the connecting sections using the bolts, the inner surface of the peripheral wall being formed to linearly extend from a bottom surface of the recess toward an opening end of the peripheral wall.

With those features, when the end housing is formed by casting, a core is placed in a casting die in a region corresponding to the recess that is to be formed in the peripheral surface of the end housing. In such a state, a molten metal is filled into the casting die. Since the core has a shape linearly extending from its part corresponding to the bottom surface of the recess toward its part corresponding to the opening end of the outer peripheral wall, the core can be easily withdrawn from the recess in the peripheral surface of the end housing by sliding the core substantially in a direction toward the opening end of the peripheral wall after the casting die has been opened. Thus, with the unit housing of the embodiment, since the inner surface of the peripheral wall of the end housing is formed to linearly extend from the bottom surface of the recess for securing the insulating space toward the opening end of the peripheral wall, the core used for forming the recess in the casting of the end housing can be easily withdrawn while avoiding interference with other protrusions, which are protruded into the inside of the end housing, by sliding the core substantially in the direction toward the opening end of the peripheral wall after the casting. As a result, the end housing can be easily formed by casting without increasing the size of the end housing.

In the unit housing for the motor unit according to the embodiment, the inner surface of the peripheral wall may be formed to linearly extend from the bottom surface of the recess toward the opening end of the peripheral wall while sloping inwards in a radial direction.

With that feature, a wall thickness at the end surface of the end housing abutted and coupled to the housing body is less restricted, and rigidity at a coupled portion between the housing body and the end housing can be maintained high.

In the unit housing for the motor unit according to the embodiment, a working hole (e.g., a working hole 34 in the embodiment) through which the bolt for each connecting section is tightened may be formed in the bottom surface of the recess at a position facing the connecting section for each phase, and the working hole may be closed by a cover member (e.g., a cover member 35 in the embodiment) in a detachable manner.

With those features, when the power lines of the respective phases and the corresponding lead wires led from the stator are connected to each other, a tool can be inserted through each working hole from the outside of the end housing, to thereby tighten the bolt in the connecting section.

In the unit housing for the motor unit according to the embodiment, a terminal holding block (e.g., a terminal holding block 22 in the embodiment) made of an insulating material may be mounted to the end housing, the terminal holding block having a plurality of cylindrical holder portions (e.g., holder portions 24 in the embodiment) which are mounted corresponding to the power lines of the respective phases while penetrating through the axial end wall of the end housing from an outside to an inside thereof, each of the holder portions may hold therein a conducting terminal (e.g., a conducting terminal 25 in the embodiment) that is to be connected to the power line of the corresponding phase, and may have a cutout (e.g., a cutout 28 in the embodiment) through which the bolt for each connecting section is placed, the cutout being formed in a part of a cylindrical wall of the holder portion, and a terminal (e.g., a terminal 31 in the embodiment) of the lead wire on the stator side may be overlaid on the corresponding to conducting terminal inside the holder portion, the terminal of the lead wire and the corresponding conducting terminal being fastened together by the bolt inwards of the cutout.

With those features, when the terminal holding block including the conducting terminal in each holder portion is mounted to the end housing and the conducting terminal in each holder portion is connected to the corresponding lead wire on the stator side by using the bolt, parts of the connecting section other than the head of the bolt exposed through the cutout is surrounded by the insulating holder portion.

In the unit housing for the motor unit according to the embodiment, the power line led in from the outside while being bent along the peripheral wall and the end wall of the end housing may be connected to the conducting terminal in each holder portion at the outside of the end wall.

With that feature, the power lines can be routed from the end housing toward the housing body, and the PDU connected to the power lines can be compactly arranged on the housing body side.

The embodiments will now be described with reference to the accompanying drawings, wherein like reference numerals designate corresponding or identical elements throughout the various drawings.

One embodiment of the present invention will be described below with reference to FIGS. 1 to 4.

Figure 2:
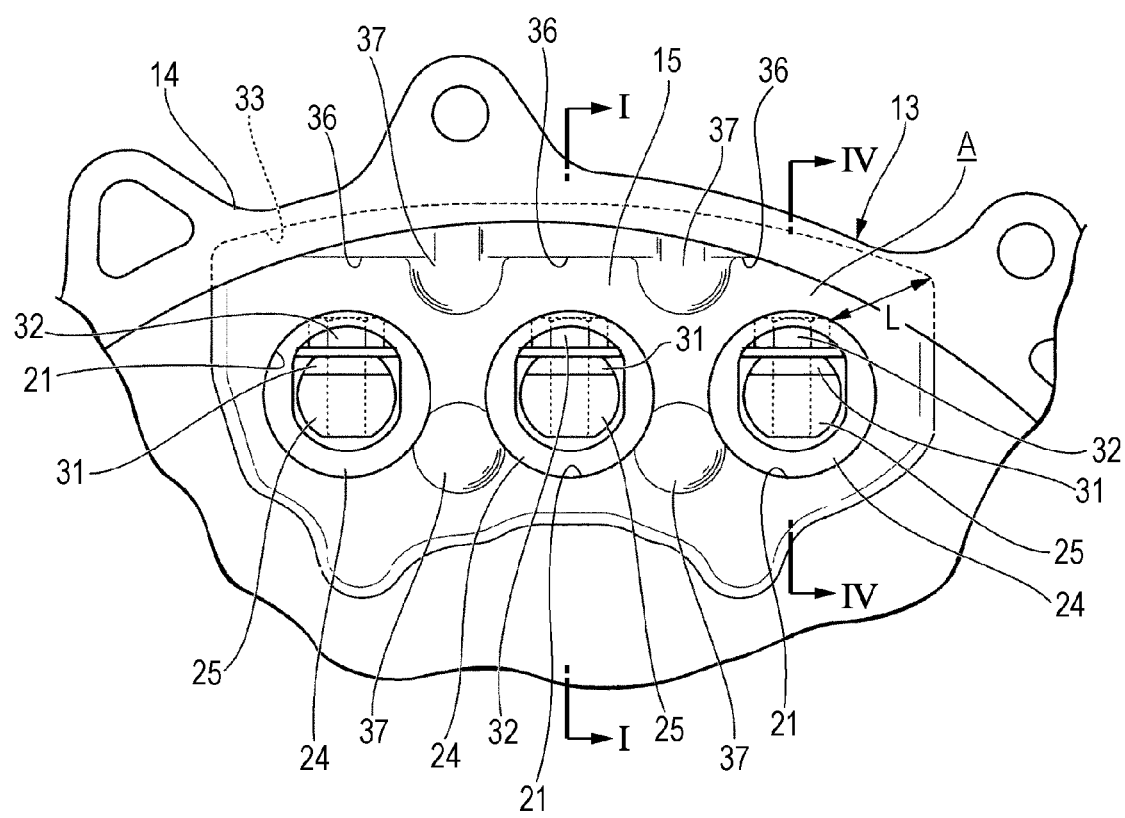
FIG. 2 is a partial view, looking in a direction denoted by an arrow II in FIG. 1, of an end housing according to the embodiment of the present invention.

FIG. 1 is a sectional view taken along a cross-section I-I in FIG. 2, the view schematically illustrating the structure of primary part of a motor unit 1 according to the embodiment. The sectional view of FIG. 1 is looked in a direction denoted by an arrow II in FIG. 2.

The motor unit 1 according to the embodiment is used as a driving source of a car. The motor unit 1 includes a motor main body 4 made up of a stator 2 and a rotor 3 as primary components, a not-shown PDU (Power Drive Unit) for supplying electric power of a battery (not shown) to the motor main body 4 and reversely charging the battery with regenerative electric power from the motor main body 4, and a rotation sensor (not shown) for detecting a rotational position of the rotor 3 of the motor main body 4.

A unit housing 10 of the motor unit 1 includes a substantially cylindrical housing body 12 in which a ring-shaped stator 2 with 3-phase lead wires 11 wound around the stator 2 is fixedly held, and an end housing 13 which is butted and coupled to an end surface of the housing body 12 and which covers an axial end of the housing body 12. The housing body 12 and the end housing 13 are each made of a metal material, such as an aluminum alloy.

The end housing 13 has an outer peripheral wall (peripheral wall) 14 abutted and coupled to the axial end surface of the housing body 12 by using bolts, and an end wall 15 extending in an axially continuous form from the outer peripheral wall 14. In this embodiment, an inner peripheral wall 16 is formed on the radially inner side of the end wall 15, and a bearing (not shown) for rotatably holding the rotor 3 and the above-mentioned rotation sensor are disposed on the inner side of the inner peripheral wall 16.

A power connection section 18 for connecting 3-phase cables 17 (power lines) led out from the PDU to the corresponding lead wires 11 on the stator 2 side, respectively, is provided at a part (upper portion in FIG. 1) of the end housing 13.

An edge of the outer peripheral wall 14 of the end housing 13 on the opening end side thereof is formed substantially in a cylindrical shape in its entirety. In the power connection section 18, however, the outer peripheral wall 14 includes a flat plate-like area extending substantially horizontally from the edge thereof toward the end wall 15. Such a flat-plate like area is referred to as a "flat plate portion 14A" herein. An extension wall 19 extending upwards is provided at a root of the flat plate portion 14A. Three cable insertion holes 20 for leading in the 3-phase cables 17 (power lines) from the outside are formed in the extension wall 19.

Three through holes 21 are formed in a region of the end wall 15, which is positioned in the power connection section 18, in a line substantially parallel to the flat plate portion 14A. A terminal holding block 22 made of an insulating material, such as a synthetic resin, is mounted to the end wall 15. The terminal holding block 22 has a base portion 23 bolted to an outer surface of the end wall 15, and three cylindrical holder portions 24 projecting from the base portion 23 and fitted respectively into the through holes 21 of the end wall 15. A conducting terminal 25 is fixedly fitted in each of the holder portions 24. One end of each conducting terminal 25 is connected, by using a bolt 27, to a bus bar 26 (power line) that is connected to corresponding one of the 3-phase cables 17. Each bus bar 26 is bent into an L-like shape to extend substantially along the end wall 15 and the outer peripheral wall 14 (flat plate portion 14A) of the end housing 13. A lower end of the bus bar 26 is connected to the conducting terminal 25 by using the bolt 27, and an upper end of the bus bar 26 is connected to a terminal 30 of the corresponding cable 17 by using a bolt 29.

A cutout 28 is formed substantially at a center of each holder portion 24 to be opened upwards. A terminal 31 of the corresponding lead wire 11 on the stator 2 side is inserted into the holder portion 24 from its distal end side, and the terminal 31 is overlaid on an upper surface of the conducting terminal 25 at a position corresponding to the cutout 28. The conducting terminal 25 and the terminal 31 on the stator 2 side, which are overlaid one above the other as described above, are connected to each other by fastening a bolt 32 inwards of the cutout 28 (thus providing a connecting section using a bolt).

A recess 33 for securing an insulating space A with respect to a head of each bolt 32 and the end housing 13 made of a metal is formed in the flat plate portion 14A (outer peripheral wall 14) of the end housing 13 at a position close to parts of the holder portions 24 where the bolts 12 are fastened, i.e., to the connecting sections. Further, an inner surface (lower surface) of the flat plate portion 14A is formed to linearly extend from a bottom surface of the recess 33 toward the opening end of the outer peripheral wall 14 while sloping inwards in the radial direction. Thus, in this embodiment, the inner surface (lower surface) of the flat plate portion 14A is formed as a tapered surface sloping inwards in the radial direction from the bottom surface of the recess 33 toward the opening end of the outer peripheral wall 14.

A working hole 34 through which the bolt 32 is tightened in an assembly step is formed in the flat plate portion 14A at a position facing the head of the bolt 32 in each holder portion 24. The working hole 34 is closed by a cover member 35, which is made of an insulating material, after the end of an operation of tightening the bolt 32. A reinforcing peripheral boss 36 is protruded at an edge of each working hole 34 in the flat plate portion 14A on the inner side (i.e., on the side facing the insulating space A).

Reference numeral 37 in FIG. 2 denotes a boss for receiving a screw (bolt) such that, when the terminal holding block 22 is bolted to the end wall 15, the bolt can be firmly tightened. Also, reference numeral 55 in FIG. 1 denotes a cover member that is attached in straddling relation to the extension wall 19 and the end wall 15 so as to cover the terminal holding block 22 from the outside.

The end housing 13 having the above-described structure is formed by casting.

Figure 3:
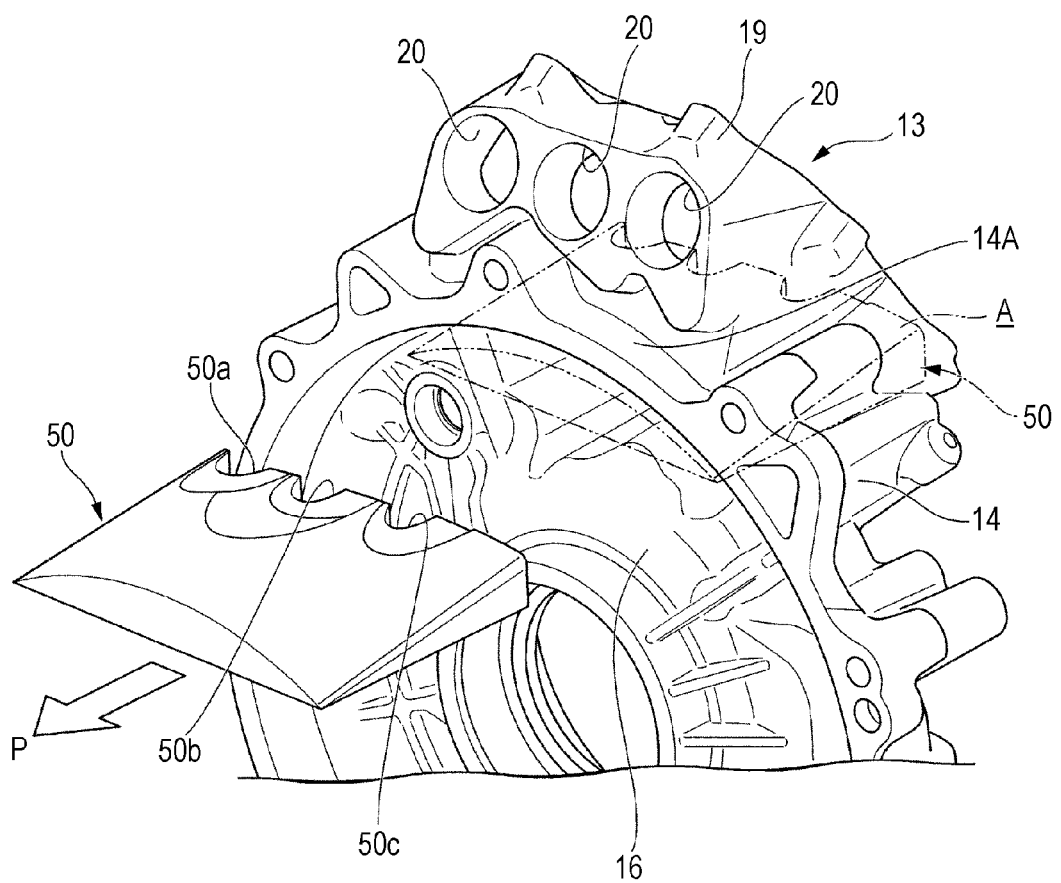
FIG. 3 is a partial perspective view, looking in a direction denoted by an arrow III in FIG. 1, of the end housing according to the embodiment of the present invention.
Figure 4:
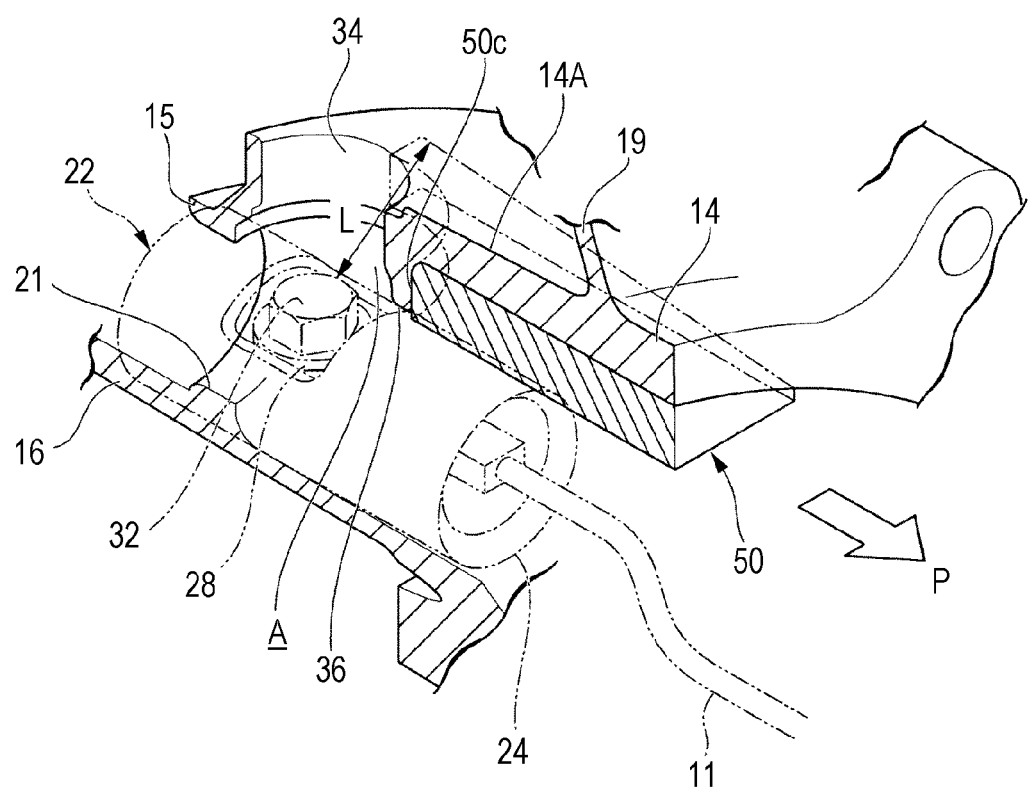
FIG. 4 is a partially-broken perspective view, broken along a cross-section IV-IV in FIG. 2, of the end housing according to the embodiment of the present invention.

FIGS. 3 and 4 illustrate the end housing 13 along with a core 50 used in the casting.

When the end housing 13 is cast, a stationary die and a movable die are split in the axial direction of the end housing 13, and the core 50 is placed in a region corresponding to the recess 33 in the outer peripheral wall 14 of the end housing 13.

As illustrated in FIG. 3, the core 50 is formed such that one axial end of the core 50 has an arc-like cross-section along an inner peripheral surface of the end housing 13 at the opening end thereof and, as approaching the other axial end of the core 50, the height of the core 50 gradually increases at both edges of the arc-like cross-section (namely, the thickness of the core 50 gradually increases at both the edges thereof). Further, as illustrated in FIG. 4, the axial cross-section of the core 50 is formed substantially in a trapezoidal shape of which upper side is linearly extended while sloping from its part corresponding to the bottom surface of the recess 33 in the end housing 13 toward its part corresponding to the opening end of the outer peripheral wall 14.

An upper surface of the core 50 serves to form the inner surface of the flat plate portion 14A (outer peripheral wall 14) of the end housing 13 over a region from the bottom surface of the recess 33 to the opening end the end housing 13. However, because the three peripheral bosses 36 are protruded from the inner surface of the flat plate portion 14A, three concaves 50a, 50b and 50c for shaping the peripheral bosses 36 are formed in a part of the upper surface of the core 50.

When the end housing 13 is practically formed by casting, the core 50 is placed in a casting die (made up of the stationary die and the movable die) in a region corresponding to the recess 33. In such a state, a molten metal is filled into the casting die. After the filled metal has been solidified, the casting die is opened. Since the core 50 has a shape linearly extending from its part corresponding to the bottom surface of the recess 33 in the flat plate portion 14A of the end housing 13 toward its part corresponding to the opening end of the outer peripheral wall 14, the core 50 can be easily withdrawn from the recess 33 in the flat plate portion 14A of the end housing 13 by sliding the core 50 in a direction toward the opening end of the outer peripheral wall 14, as denoted by an arrow P in FIGS. 3 and 4, after the casting die has been opened.

Although the bosses 37 for receiving the screws and the peripheral bosses 36 are protruded in the complex form into the end housing 13 in the region corresponding to the recess 33, the core 50 can be withdrawn from the inside of the end housing 13 while avoiding the bosses 37 for receiving the screws and the peripheral bosses 36 with no need of stroking the core 50 in the radially inward direction of the end housing 13 to a large extent.

Thus, in the casting of the end housing 13 having the above-described structure, since the core 50 can be withdrawn from the outer peripheral wall 14 after shifting the core 50 in the direction toward the opening end of the outer peripheral wall 14, interference of the core 50 with the bosses protruded into the inside of the end housing 13 can be avoided when the core 50 is withdrawn, even with the core 50 having a sufficiently increased width and height.

Accordingly, the insulating space A having a sufficiently large size can be secured in the end housing 13 that has been formed by using the core 50 having the sufficiently increased width and height. If the width and the height of the core 50 are not sufficiently secured, the connecting section using the bolt 32, which corresponds to one phase and which is located near the end of the core 50 in the widthwise direction thereof, is positioned close to the outer peripheral wall 14. In contrast, with the end housing 13 according to this embodiment, since the core 50 has the sufficient width and height, an insulating distance L (see FIGS. 2 and 4) between the connecting section using the bolt 32, which corresponds to one phase and which is located near the end of the core 50 in the widthwise direction thereof, and the outer peripheral wall 14 can be sufficiently increased.

Hence, by employing the above-described structure of the unit housing 10, the end housing 13 can be easily formed by casting without increasing the size and the weight of the unit housing 10.

Further, with the unit housing 10 according to this embodiment, since the inner surface of the flat plate portion 14A of the end housing 13 is formed to linearly extend from the bottom surface of the recess 33 toward the opening end of the outer peripheral wall 14 while sloping inwards in the radial direction, a sufficient wall thickness can be obtained at the opening end of the outer peripheral wall 14 and the above-described easiness in withdrawing the core 50 can be ensured at the same time. As a result, this embodiment can maintain high rigidity at the coupled portion between the housing body 12 and the end housing 13.

Moreover, the unit housing 10 has such a structure that each bus bar 26 bent to extend substantially along the outer peripheral wall 14 (flat plate portion 14A) of the end housing 13 and the end wall 15 is attached to the terminal holding block 22, the lower end of the bus bar 26 is connected to the conducting terminal 25 in the corresponding holder portion 24, and the upper end of the bus bar 26 is connected to the corresponding cable 17 on the PDU side, the cable 17 being led in through the cable insertion hole 20. That structure is advantageous in enabling the PDU to be compactly arranged on the side near the housing body 12.

It is to be noted that the present invention is not limited to the embodiment described above and the present invention can be variously changed in design without departing from the gist thereof.

Obviously, numerous modifications and variations of the present invention are possible in light of the above teachings. It is therefore to be understood that within the scope of the appended claims, the invention may be practiced otherwise than as specifically described herein.

What is claimed is:

1. A unit housing for a motor unit, the unit housing comprising:
    a substantially cylindrical housing body including a ring-shaped stator and lead wires wound around the ring-shaped stator;
    an end housing made of a metal, the end housing being butted and coupled to an end surface of the substantially cylindrical housing body and covering an axial end of the substantially cylindrical housing body, the end housing having a peripheral wall and an end wall, the peripheral wall being coupled to the substantially cylindrical housing body, the end wall extending in an axially continuous form from the peripheral wall; and
    connectors including bolts to connect respectively 3-phase power lines to the lead wires led from the ring-shaped stator, each of the connectors being disposed inside the end housing, the 3-phase power lines being led in the unit housing from an outside through the end wall, wherein
    the peripheral wall includes a recess to secure an insulating space between an inner surface of the peripheral wall and each of the connectors, the recess being provided in the inner surface of the peripheral wall at a position close to the connectors, and
    the inner surface of the peripheral wall being provided to linearly extend from a bottom surface of the recess toward an opening end of the peripheral wall,
    wherein the peripheral wall includes a first inner surface and a second inner surface,
    wherein the first inner surface is provided at the opening end of the peripheral wall,
    wherein the second inner surface is provided closer to the bottom surface of the recess than the first inner surface, and
    wherein the first inner surface is provided below the second inner surface when viewed from an axial direction of the substantially cylindrical housing body.

2. The unit housing for the motor unit according to claim 1, wherein
    a working hole through which the bolt is tightened is provided in the bottom surface of the recess at a position facing the connector, and
    the working hole is closed by a cover member in a detachable manner.

3. The unit housing for the motor unit according to claim 2, further comprising:
    a terminal holding block made of an insulating material and mounted to the end housing, the terminal holding block having a plurality of cylindrical holder portions which respectively correspond to the 3-phase power lines, each of the cylindrical holder portions penetrating through the end wall of the end housing from an outside to an inside of the end housing, wherein
    the cylindrical holder portions respectively hold conducting terminals that are to be connected to the 3-phase power lines, each of the cylindrical holder portions having a cutout through which the bolt is placed, the cutout being provided in a part of a peripheral wall of the holder portion, and
    terminals of the lead wires on a stator side are respectively overlaid on the conducting terminals inside the cylindrical holder portions, the terminals of the lead wires being respectively fastened to the conducting terminals by the bolts provided in the cutouts.

4. The unit housing for the motor unit according to claim 3, wherein the 3-phase power lines are led in the unit housing from an outside while being bent along the peripheral wall and the end wall of the end housing, the 3-phase power lines being respectively connected to the conducting terminals in the holder portions at an outside of the end wall.

5. The unit housing for the motor unit according to claim 1, wherein an outline of the bottom surface of the recess is provided radially outward of an outline of the opening end of the peripheral wall when viewed from an axial direction in which the substantially cylindrical housing body extends.

* * * * *